Dec. 2, 1941.                    W. H. BENNETT                    2,264,285
            ELECTRICAL RESISTANCE AND METHOD OF MAKING SAME
                              Filed June 3, 1939
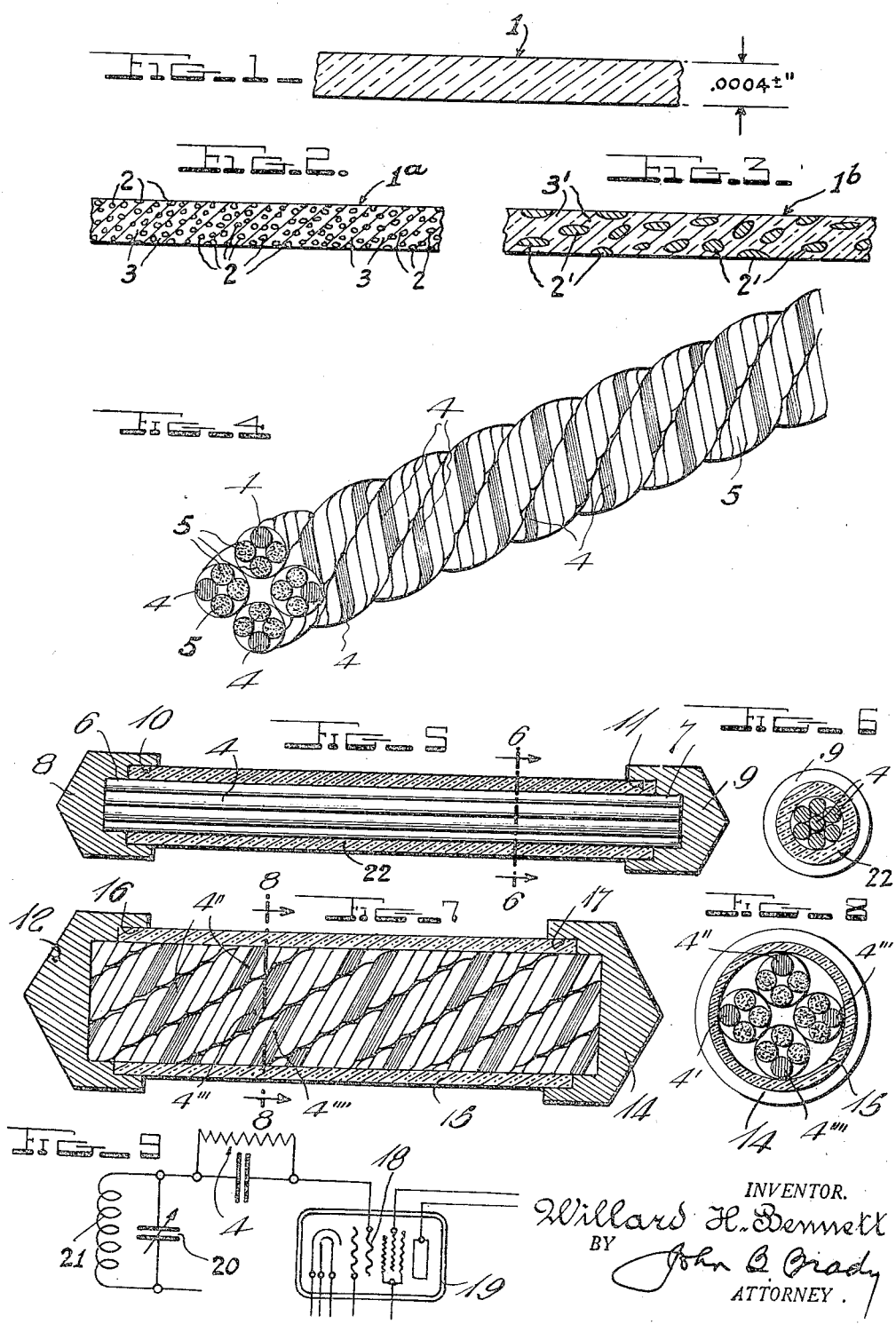

Patented Dec. 2, 1941

2,264,285

UNITED STATES PATENT OFFICE 2,264,285

ELECTRICAL RESISTANCE AND METHOD OF MAKING SAME

Willard H. Bennett, Newark, Ohio, assignor, by mesne assignments, to Owens-Corning Fiberglas Corporation, Toledo, Ohio, a corporation of Delaware Application June 3, 1939, Serial No. 277,286

12 Claims. (Cl. 201—76)

My invention relates broadly to electrical resistances and more particularly to a method of making high resistances for uses such as grid leaks and high voltage potential dividers.

One of the objects of my invention is to provide a method of preparing electrical resistances of extremely constant and permanent value.

Another object of my invention is to provide a method of inexpensively fabricating electrical resistors from glass fibers.

Still another object of my invention is to provide a method of treating glass fibers which contain metal for rendering the fibers electrically conducting and thereafter controlling the conductivity thereof to form electrical resistors of permanent resistance value.

A further object of my invention is to provide an improved construction of electrical resistance formed from treated glass fibers.

A still further object of my invention is to provide a construction of electrical resistance formed from a composite arrangement of treated and untreated glass fibers whose combined resistance determines the net resistance of the unit of the resistor thus formed.

Another object of my invention is to provide a construction of electrical resistance formed from glass fibers which are wholly embedded in insulating material with terminals electrically connected with opposite ends of the fibers for forming a constant resistance of high value.

Other and further objects of my invention reside in the method of treating glass fibers for fabricated electrical resistance units as set forth more fully in the specification hereinafter following by reference to the accompanying drawing, in which:

Figure 1 is a greatly enlarged longitudinal sectional view of a homogeneous drawn glass fiber having a metallic content; Fig. 2 is a similar view of the same glass fiber illustrated in Fig. 1 after the fiber has been heated in the atmosphere of hydrogen for subjecting the metallic content to a reduction process and rendering the metallic particles colloidal; Fig. 3 is a similar view of the glass fiber of Fig. 2 after it has been subjected to a further increase in temperature and the colloidal metallic particles have coalesced; Fig. 4 illustrates one method I employ for intertwining a plurality of strands of treated and untreated glass fibers for forming a composite resistance unit; Fig. 5 illustrates one form of resistance unit constructed in accordance with my invention; Fig. 6 is a cross sectional view taken on line 6—6 of Fig. 5; Fig. 7 illustrates another form of resistance unit constructed in accordance with my invention; Fig. 8 is a transverse sectional view taken on line 8—8 of Fig. 7; and Fig. 9 shows a diagrammatic circuit arrangement illustrating one application of the permanent electrical resistance of my invention.

My invention is directed to a method of manufacturing electrical resistors inexpensively on a quantity basis which will have the characteristic of high fixed resistance with a high degree of permanency. The value of the resistance may be established with precision by control of the metallic content of the mass of glass from which the resistor of my invention is formed. I employ a mass of molten glass having a high percentage of metal content such as, for example, eleven (11%) per cent by weight of copper. Glass fibers are drawn from the mass of glass containing the copper content utilizing the methods set forth in Games Slayter Patent 2,133,235, of October 11, 1938, for Method and apparatus for making glass wool, and Games Slayter and John H. Thomas Patent 2,133,236, of October 11, 1938, for Glass wool and method and apparatus for making same. Glass fibers containing metallic content are thus produced having physical characteristics somewhat analogous to the glass fibers illustrated in Games Slayter and John H. Thomas Patent 2,133,238, of October 11, 1938, for Glass fabric.

A strand of the glass fibers thus produced is illustrated in Fig. 1 by reference character 1 as comprising a homogeneous body having an average diameter of about .0004 inch. The glass fibers are heat treated in an atmosphere of hydrogen with temperatures of the order of 550° C. and the fibers become electrically conducting by virtue of the liberation of colloidal particles as represented in Fig. 2. The colloidal particles of copper are illustrated under conditions of very large magnification at 2. These colloidal particles 2 do not touch each other but electrons are able to jump from particle to particle of copper in the treated strands 1a through the spacial distances 3 separating these particles provided the distances 3 are as small as the order of magnitude of the electron wave length. The rate of reduction of the fibers is a continuing one such that the rate of change of the quantity of reduced copper will decrease with the decrease in the remaining quantity of available reducible copper in chemical combination. This rate of reduction of copper will be in competition with a rate of coalescence of reduced copper and this rate of coalescence will increase with increase in temperature. Therefore, there is an optimum temperature and time for treatment at such reducing temperature which is fixed by the chemical composition of the glass, the diameter of the fiber and the character of the reducing atmosphere or reducing agent. It can be shown in at least most instances that the conductivity is to be expected to rise to a maximum value and then decrease with continued reduction at any given fixed elevated temperature. The value of this maximum obtainable conductivity will be different for different reducing temperatures for any given glass composition and any reducing atmosphere.

If the temperature is increased or the heating prolonged over the temperature or the time for producing the greatest degree of conductivity in the fibers, the colloidal particles of copper coalesce, forming larger globules of copper in the glass and the conductivity of the fibers disappears. The internal structure of the fibers at this advanced stage of heat treatment is represented in Fig. 3, where the fiber 1b is shown with globules 2' of copper separated by spaces 3'. It is seen by comparison of Figs. 2 and 3 that the characteristic of the colloidal form, Fig. 2, by which conductivity is obtained, that is the very small separation of the particles of copper, is lost when the colloidal particles coalesce. As a result, the fiber 1b, Fig. 3, is substantially as good an insulator as the untreated fiber 1 of Fig. 1. The resistor of my invention is that represented at 1a in Fig. 2; in the process of my invention, this stage of the heat treatment may be determined by the deep purple color of the fibers, characteristic of colloidal copper, which changes into a straw color characteristic of copper under glass as the amount of coalesced copper grows predominant.

After treatment of the fibers as herein described, I may intertwine a multiplicity of such fibers in a yarn which I have indicated generally in Fig. 4. The treated glass fibers are indicated at 4 intertwined with glass fibers 1 which contain little or no copper or other reducible metal. The aggregate resistance of a multiplicity of intertwined fiber strands depends upon the conductivity of the individual fiber strands and the multiplicity of strands may be mounted in a suitable carrier to form an element of an electrical circuit.

Instead of intertwining a multiplicity of treated and untreated fiber strands, I may directly mount fiber strands after heat treatment as illustrated in Fig. 5. The thread or fiber 4 is embedded in an insulating body 22 such as, for example, a plastic or a varnish or water glass or any other insulating material. The coating may be constituted by a glass tubing through which the fiber 4 is drawn or the sheath 22 may be glass molded directly about and in intimate contact with the glass fiber 4. The ends of the glass fiber 4 extend beyond the ends of the insulated coating 22 as indicated at 6 and 7. Around the ends 6 and 7, the conducting terminal caps 8 and 9 are formed. The conducting terminal caps 8 and 9 may be cast directly about the extended ends 6 and 7 of the glass fiber forming an intimate electrical connection therewith. A tight mechanical connection may be established between the ends of the insulated sheath 22 and the conducting terminal caps 8 and 9 at 10 and 11.

In Fig. 7 I have shown the manner of embedding an intertwined resistor of the construction illustrated in Fig. 4. In this arrangement the intertwined treated fibers indicated at 4', 4'', 4''' and 4'''' establish intimate electrical connection with the conductive end caps 12 and 14. The end caps 12 and 14 are secured over the ends of the dielectric coating 15 which surrounds the intertwined fibers and are mechanically secured at 16 and 17.

In both the forms illustrated in Figs. 5 and 7 rigidity is imparted to the fiber strands by the dielectric coating which intimately surrounds the fiber strands. Because of the intimate interior surface contact between the tubular dielectric coating and the fiber strands, heat generated in the conducting fibers is readily dissipated. The coating 22 and 15 in Figs. 5 and 7 respectively is both an electrically insulating coating as well as a heat conducting coating. Tendency to dielectric failure through the formation of thermal currents is substantially overcome. Since the conductivity is electronic and the resistor would contain no electrolytes whatsoever, the difficulties due to polarization and electrolytic heating are absent. In addition to this, the only noise present in this kind of a conductor would be the Johnson effect so that this kind of resistor is ideal for grid leaks in electron tube circuits. I have illustrated one application of my invention to an electron tube circuit in which the resistor is indicated at 4 connected in shunt with a condenser 20 disposed between input circuit 21 and grid 18 of the tube indicated generally at 19. Because of the constant and high resistance characteristic of the glass fiber resistance of my invention, the resistance finds many applications in connection with electron tube circuits and in connection with high voltage potential dividers.

While I have described my invention in certain of its preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. The method of making electrical resistances which comprises drawing fibers from molten glass of a composition including a conductive metal in chemical combination, and heat treating the fibers in a reducing atmosphere and at a sufficiently high temperature to produce a colloidal dispersion of metallic particles in the glass, the fibers with said colloidal dispersion therein having semi-conductive properties characteristic of an electrical resistance.

2. The method of making electrical resistances which comprises drawing fibers from molten glass of a composition including copper in chemical combination, and heating the fibers in a reducing atmosphere and at a sufficiently high temperature to produce the deep purple color characteristic of colloidal copper in the fibers, the fibers with the colloidal copper therein having semi-conductive properties characteristic of an electrical resistance.

3. The method of making electrical resistances which comprises drawing fibers from molten glass of a composition including a conductive metal in chemical combination, and heating the fibers in a reducing atmosphere and at temperatures of the order of 550° C. for producing submicroscopic metallic bodies throughout the fibers with spaces therebetween of the order of magnitude of the wave length of the electron, whereby electrons may be transferred between said bodies, the fibers with said submicroscopic bodies therein having semi-conductive properties characteristic of an electrical resistance.

4. The method of making electrical resistances which comprises drawing fibers from molten glass of a composition including a conductive metal in chemical combination, and heating the fibers in a reducing atmosphere, at such temperatures and for such duration as will cause the metal to be reduced and reduced metal atoms to coalesce into submicroscopic metallic aggregates spaced by distances of the order of magnitude of the wave length of the electron, the heat treatment being terminated before said submicroscopic aggregates can grow to such an extent that the distances therebetween substantially exceed the wave length of the electron, the treated glass fibers having semi-conductive properties characteristic of an electrical resistance.

5. The method of making electrical resistances which comprises drawing fibers from molten glass of a composition including a conductive metal in chemical combination, and heating the fibers in a reducing atmosphere, at such temperatures and for such duration that the fibers assume a color characteristic of the colloidal state of the metal in the glass compound, the heat treatment being terminated before the fibers can assume a color characteristic of the free metal, the fibers with the colloidal metal therein having semi-conductive properties characteristic of an electrical resistance.

6. An electrical resistance comprising a fiber of glass containing a colloidal suspension of metal of such density that the distances between the colloidal particles are of the order of magnitude of the wave length of the electron, whereby electrons may be transferred between said colloidal particles, said fiber having semi-conductive properties due to the transfer of electrons between the colloidal particles in the glass under the influence of an electromotive force applied at the ends of said fiber.

7. As a product of manufacture, a fibrous glass body having colloidal metal dispersed therein to provide a semi-conductive electrical characteristic, an adherent covering of insulation material on said glass body for protecting said body from contact and breakage, and terminals for said body connected with the ends thereof and engaging said covering in sealing relation.

8. An electrical resistance which comprises a multiplicity of electrically semi-conductive and electrically non-conductive glass fiber strands intertwined one with another, the glass of said semi-conductive strands having colloidal metal dispersed therein to provide the desired electrical characteristic, a dielectric envelope for imparting rigidity to said fiber strands, and means for establishing electrical connection with opposite ends of said semi-conductive fiber strands.

9. An electrical resistance comprising a multiplicity of intertwined electrically semi-conductive and electrically non-conductive glass fiber strands, the glass of said semi-conductive strands having colloidal metal dispersed therein to provide the desired electrical characteristic, a dielectric sheath extending in intimate relation to said intertwined glass fiber strands, and terminating short of the ends of said glass fiber strands, means engaging opposite ends of said dielectric sheath and establishing electrical connection with the ends of said glass fiber strands for employing said semi-conductive glass fiber strands as electrical resistances.

10. The method of making electrical resistances from glass fibers having a high metallic chemical content which includes heat treating the fibers in a reducing atmosphere and at a sufficiently high temperature to produce a colloidal dispersion of metallic particles in glass, the fibers with said colloidal dispersion therein having semi-conductive properties characteristic of an electrical resistance.

11. As a product of manufacture, a fibrous body of glass containing colloidal copper dispersed therein, the colloidal particles of copper being spaced distances of the order of magnitude of the wave length of the electron, whereby electrons may be transferred between said colloidal particles, providing a semi-conductive electrical characteristic for said body.

12. An electrical resistance which comprises a plurality of electrically semi-conductive glass fibers parallelly related, the glass of said semi-conductive fibers having colloidal metal dispersed therein to provide the desired electrical characteristic, and terminals secured to opposite ends of said fibers for establishing electrical connection with said opposite ends.

WILLARD H. BENNETT.